(12) United States Patent
Hartwig (10) Patent No.: US 9,163,740 B2
(45) Date of Patent: Oct. 20, 2015

(54) INTERCHANGEABLE VALVE FOR A VALVE BLOCK USED WITH A GLASS MACHINE

(75) Inventor: Johannes Hartwig, Seeheim-Jugenheim (DE)

(73) Assignee: ROSS EUROPA GmbH, Langen (DE)

( * ) Notice: Subject to any disclaimer, the term of this patent is extended or adjusted under 35 U.S.C. 154(b) by 191 days.

(21) Appl. No.: 13/805,075

(22) PCT Filed: Jul. 2, 2010

(86) PCT No.: PCT/EP2010/004015
§ 371 (c)(1),
(2), (4) Date: May 23, 2013

(87) PCT Pub. No.: WO2011/160661
PCT Pub. Date: Dec. 29, 2011

(65) Prior Publication Data
US 2013/0240074 A1 Sep. 19, 2013

Related U.S. Application Data

(60) Provisional application No. 61/356,782, filed on Jun. 21, 2010.

(51) Int. Cl.
*F16K 27/00* (2006.01)
*C03B 9/36* (2006.01)
(Continued)

(52) U.S. Cl.
CPC ............... *F16K 27/00* (2013.01); *C03B 9/3636* (2013.01); *C03B 9/406* (2013.01); *F16K 11/20* (2013.01); *F16K 27/003* (2013.01); *Y10T 137/87885* (2015.04)

(58) Field of Classification Search
CPC ....... F16K 27/00; F16K 11/20; F16K 27/003; C03B 9/406; C03B 9/3636; F15B 13/0814; F15B 13/0825; Y10T 137/87885

USPC ............ 137/884, 271, 269; 65/227–236, 261, 65/300–301; 24/457, 458
See application file for complete search history.

(56) References Cited

U.S. PATENT DOCUMENTS 4,082,324 A * 4/1978 Obrecht ...................... 285/124.5
4,708,730 A * 11/1987 Ziegler et al. ................... 65/261
(Continued)

FOREIGN PATENT DOCUMENTS

EP 0918179 A2 5/1999
GB 2277082 A 10/1994
(Continued)

OTHER PUBLICATIONS

International Search Report and Written Opinion for PCT Application No. PCT/EP2010/004015 mailed on Apr. 13, 2011.
(Continued)

*Primary Examiner* — John Fox
*Assistant Examiner* — Michael R Reid
(74) *Attorney, Agent, or Firm* — Carlson, Gaskey & Olds, P.C.

(57) ABSTRACT

An air valve manifold (20) to be used with a glass making machine includes a base (24) and a valve (22) including a valve body attached to the base (24). The valve body includes a first projection (42) on a front of the valve body and an opposing second projection (44) on an opposing rear of the valve body. A first attachment feature (50) is secured to the front of the base to retain at least a portion of the first projection (42) of the valve body. A second attachment feature (52) is secured to the base to retain at least a portion of the opposing second projection (44) of the valve body.

28 Claims, 6 Drawing Sheets

(51) Int. Cl.
*C03B 9/40* (2006.01)
*F16K 11/20* (2006.01)

(56) References Cited

U.S. PATENT DOCUMENTS

| | | | |
|---|---|---|---|
| 5,333,647 A | 8/1994 | Fukano et al. | |
| 7,806,383 B2 | 10/2010 | Tran et al. | |
| 2005/0039807 A1* | 2/2005 | Ford et al. | 137/884 |

FOREIGN PATENT DOCUMENTS

| | | |
|---|---|---|
| JP | 3-29786 | 3/1991 |
| JP | 4-121588 | 10/1992 |
| JP | 6-1809 | 1/1994 |
| JP | 10-002432 | 1/1998 |
| JP | 10-002433 | 1/1998 |
| JP | 10-184966 | 7/1998 |
| JP | 11-093905 | 4/1999 |
| WO | 82/02880 | 9/1982 |

OTHER PUBLICATIONS

International Preliminary Report on Patentability for PCT Application No. PCT/EP2010/004015 mailed on Aug. 28, 2012.
Japanese Office Action for Japanese Application No. 2013-515706 dated Apr. 1, 2014.

* cited by examiner

INTERCHANGEABLE VALVE FOR A VALVE BLOCK USED WITH A GLASS MACHINE

BACKGROUND OF THE INVENTION

The present invention relates generally to a single touch interchangeable valve used in a valve block used with a glass making machine.

In prior systems, a top group of valves are located on a top surface of a valve block base, and a bottom group of valves are located on a bottom surface of the valve block base. Each of the top valves are attached to the valve block base by mounting screws that are inserted in a vertical direction from the top, and each of the bottom valves are attached to the valve block base by mounting screws that are inserted in a vertical direction from the bottom. In one prior system, four mounting screws are employed to secure each valve to the valve block base. It is difficult to access the mounting screws of the bottom valves when the bottom valves need to be changed, repaired or for maintenance due to the location of the mounting screws.

SUMMARY OF THE INVENTION

An air valve manifold includes a base and a valve including a valve body attached to the base. The valve body includes a first projection on a front of the valve body and an opposing second projection on an opposing rear of the valve body. A first attachment feature is secured to the front of the base to retain at least a portion of the first projection of the valve body. A second attachment feature is secured to the base to retain at least a portion of the opposing second projection of the valve body.

In another exemplary embodiment, an air valve manifold includes a base and a valve including a valve body attached to the base. The valve body includes a first projection on a front of the valve body and an opposing second projection on an opposing rear of the valve body. A first attachment feature is secured to the front of the base to retain at least a portion of the first projection of the valve body. The first attachment feature includes a first attachment feature projection that defines a recess underneath such that the first projection of the valve body is located in the recess between the first attachment feature projection of the first attachment feature and the base. A second attachment feature is secured to the base to retain at least a portion of the opposing second projection of the valve body. The second attachment feature includes a second attachment feature projection that defines a recess underneath such that the second projection of the valve body is located in the recess between the second attachment feature projection of the second attachment feature and the base. The first projection and the second projection are located near a lower portion of the valve body.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompanies the detailed description can be briefly described as follows.

DETAILED DESCRIPTION OF PREFERRED EMBODIMENTS

Figure 1:
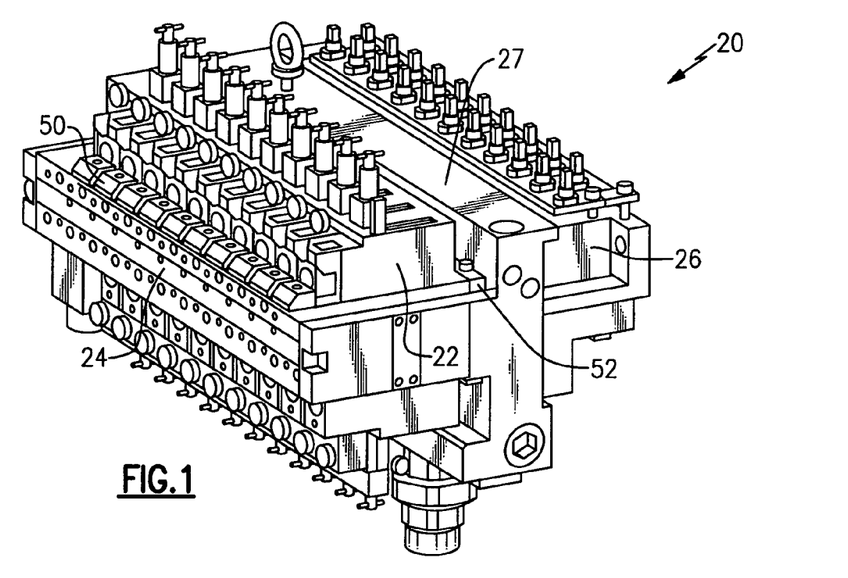
FIG. 1 illustrates a perspective view of a valve block with single touch interchangeable valves.
Figure 2:
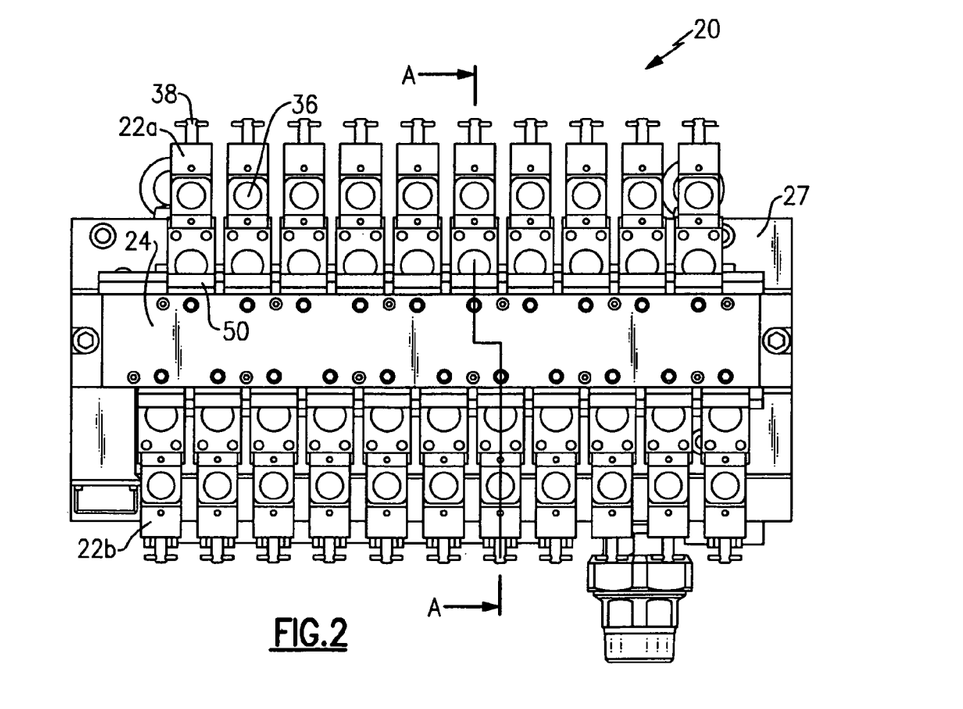
FIG. 2 illustrates a front view of the valve block with the single touch interchangeable valves.
Figure 3:
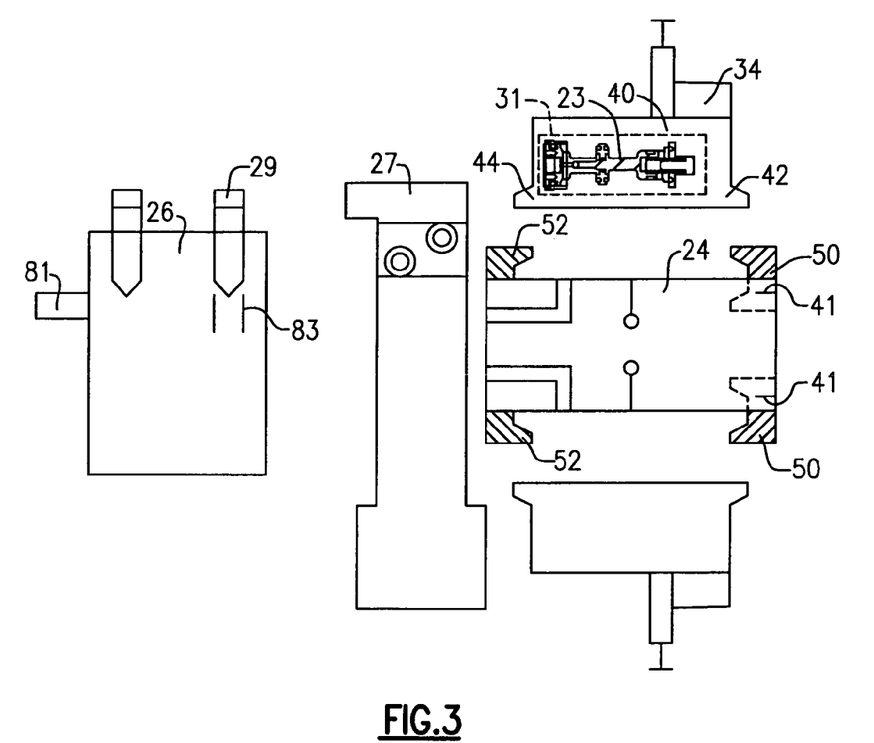
FIG. 3 illustrates an exploded view of the valve block with the single touch interchangeable valves.

FIGS. 1, 2 and 3 illustrate a valve block with single touch interchangeable valves 20 used to control functions in a process of forming hollow glass bottles 78. Usually, the valve block with single touch interchangeable valves 20 includes twenty one (21) valves 22. However, the valve block with single touch interchangeable valves 20 could include twenty six (26) valves 22. The valve block with single touch interchangeable valves 20 includes a base 24 to which the valves 22 are mounted. Eleven valves 22 are located on a top row of the base 24, and ten valves 22 are located on a bottom row of the base 24.

An air entry unit 27 supplies the base 24 with pressurized air, and a speed control unit 26 is also mounted to the air entry unit 27. The speed control unit 26 controls parameters, such as the air speed and the amount of air flowing into the glass making machine by the use of a needle valve 83. By moving a needle 29 downwardly, the airflow through a port 81 to the glass making machine will decrease. When glass bottles 78 are to be made, each valve 22 performs or contributes to a function in the process of forming the glass bottles 78, as explained below and shown in FIG. 11.

Figure 4:
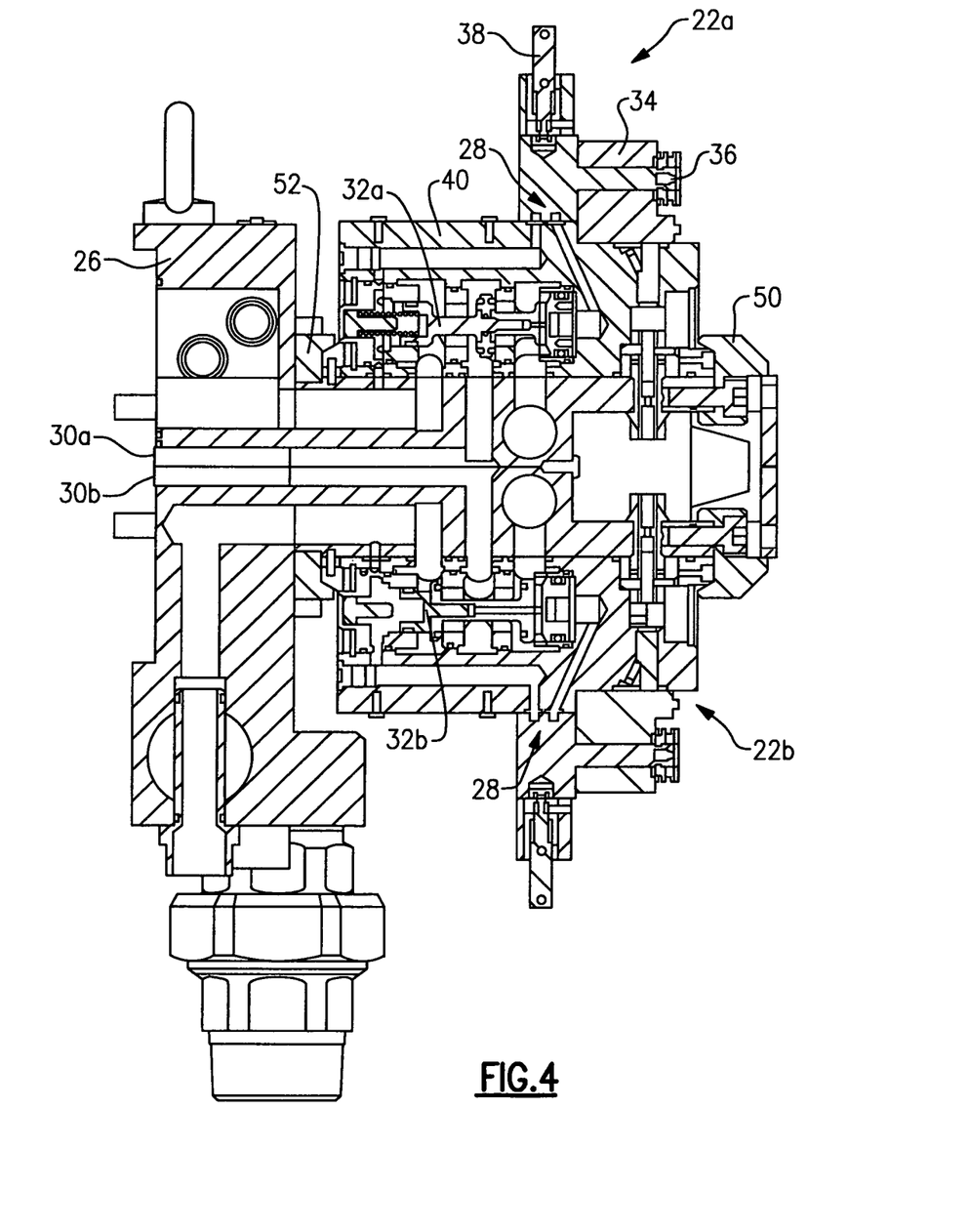
FIG. 4 illustrates a cross sectional view of the valve block with the single touch interchangeable valves taken along line A-A of FIG. 2 when a pilot is de-energized.
Figure 5:
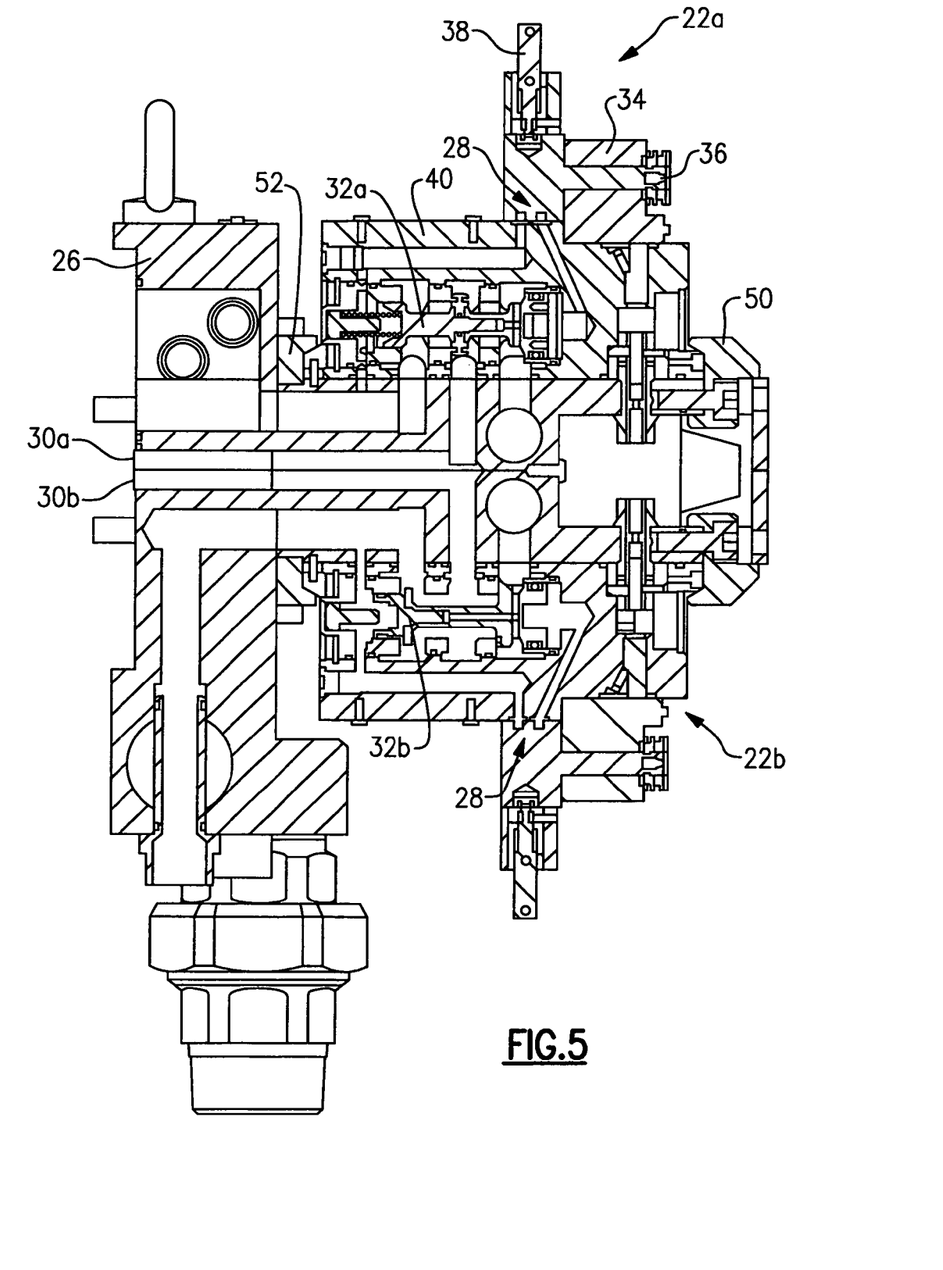
FIG. 5 illustrates a cross sectional view of the valve block with the single touch interchangeable valves taken along line A-A of FIG. 2 when the pilot is energized.

As shown in FIGS. 4 and 5 the valves 22 can each be normally open or normally closed. The valve 22 includes a cartridge insert 23 that is a 3/2 valve that includes 3 ports and 2 positions. The cartridge insert 23 includes a cartridge housing 31, as shown in dashed lines. FIGS. 4 and 5 illustrate a valve 22a that is normally open and a valve 22b that is normally closed. As shown in FIG. 4, when a pilot 28 is de-energized, the valve 22a is normally open, and the valve 22b is normally closed. Pistons 32a and 32b of the cartridges inserts 23 of the valves 22a and 22b, respectively, are located in a first position. Pressure flows through the outlet 30a of the valve 22a, but does not flow through the outlet 30b of the valve 22b and is exhausted.

As shown in FIG. 5, when a pilot 28 is energized by activating a magnet 34 of a solenoid, the valve 22a is closed, and the valve 22b is open. The pistons 32a and 32b of the valves 22a and 22b, respectively, are moved and located in a second position. Pressure flows through the outlet 30b of the valve 22b, but does not flow through the outlet 30a of the valve 22a and is exhausted. The magnet 34 is attached to the valves 22a and 22b by a fastener 36. Each valve 22a and 22b further includes a hand operative manual release 38.

Figure 6:
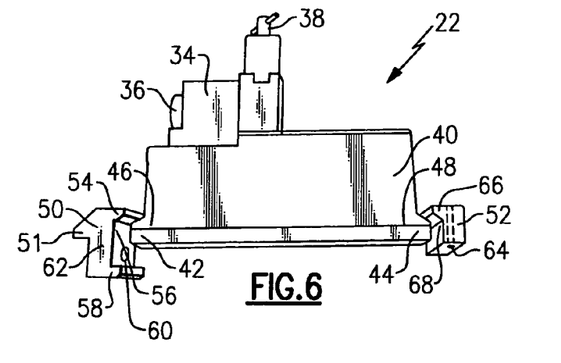
FIG. 6 illustrates a side view of a single touch interchangeable valve.
Figure 7:
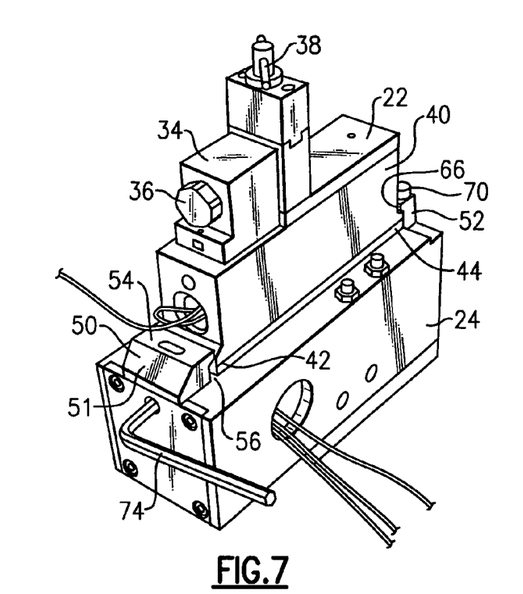
FIG. 7 illustrates a perspective view of the single touch interchangeable valve attached to a schematic base.
Figure 8:
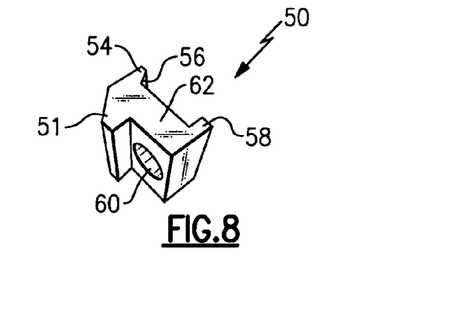
FIG. 8 illustrates a perspective view of a clamp.

As shown in FIG. 6, the valve 22 also includes a valve body 40 including beveled projections 42 and 44 on the lower front region 46 and lower rear region 48, respectively, of the valve body 40. A clamp 50 and a block 52 are used to secure the valve 22 to the base 24 (as shown in FIG. 1 and FIG. 7). The shape of the clamp 50 is substantially C-shaped to form a counter bearing.

As shown in FIG. 7, the clamp 50 includes a projection 54 at a top of the clamp 50 defining a recess 56 underneath that is shaped to receive the beveled projection 42 of the valve body 40. The clamp 50 also includes a projection 58 at the bottom of the clamp 50 and a hole 60 that extends generally parallel to the projection 58. The projections 54 and 58 are separated by a stem 62 that includes the hole 60.

The block 52 includes at least one hole 64 extending in a generally vertical direction. In one example, the block 52 includes two holes 64. The block 52 also includes a projection 66 at the top of the block 52 that defines a recess 68 underneath the projection 66 that is shaped to receive to the beveled projection 44 of the valve body 40.

Figure 9:
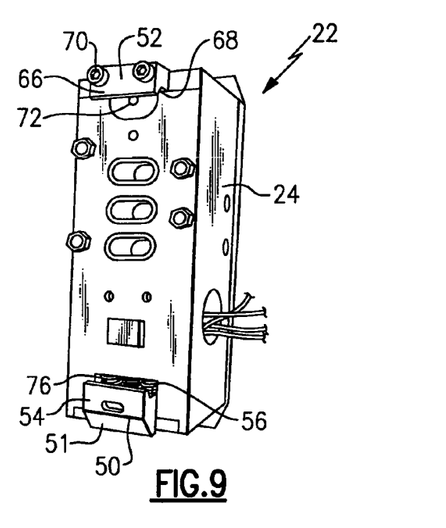
FIG. 9 illustrates a perspective view of the clamp and a block attached to the schematic base.

FIG. 7 illustrates a perspective view of a single valve 22. The valve 22 is secured to the base 24 by the clamp 50 and the block 52. The base 24 includes two holes (not shown). The block 52 is positioned such that the holes 64 of the block 52 align with the holes of the base 24. A mounting screw 70 is received in the aligned holes to secure the block 52 to the base 24, as shown in FIG. 9. Once secured, the recess 68 is defined between the projection 66 of the block 52 and the base 24. The recess 68 can receive the beveled projection 44 of the valve body 40. For example, the valve body 40 could be slid rearwardly until the beveled projection 44 is received in the recess 68 and under the projection 66.

In one example, one of the valve body 40 and the base 24 includes a projection 72, and the other of the valve body 40 and the base 24 includes a slot (not shown). The projection 72 is received in the slot when the valve body 40 is slid relative to the base 24 to ensure proper alignment of these components. In the example in FIG. 9, the base 24 includes the projection 72, and the valve body 40 includes the slot (not shown).

The clamp 50 is then used to secure the valve 22 in place. The clamp 50 is positioned such that the projection 54 is located over the beveled projection 42 of the valve body 40. Moving the clamp 50 towards the valve body 40 will clamp the valve body 40 between the clamp 50 and the block 52. A fastener 41 is received in the hole 60 of the clamp 50 and an aligned hole (opening) in the base 24. An Allen key 74 is used to rotate the fastener 41 to secure the clamp 50 to the base 24 such that the beveled projection 42 of the valve body 40 is located under the projection 54 of the clamp 50. The beveled projections 42 and 44 of the valve body 40 are received under the recesses 56 and 68, respectively, of the clamp 50 and the block 52, respectively, securing the valve 22 to the base 24. The beveled projections 42 and 44 deflect the force of the clamp 50 and push the valve body 40 towards the base 24. The pressing force and the seals provide an airtight connection.

Figure 10:
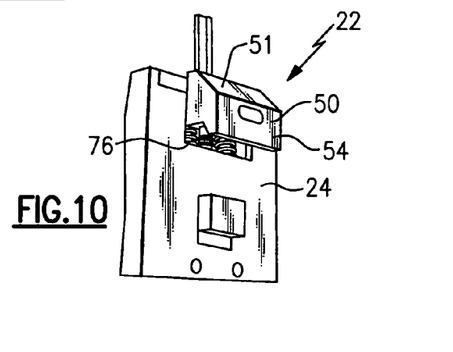
FIG. 10 illustrates a perspective view of the clamp attached to the schematic base.

As shown in FIG. 10, a resilient member 76 is located between the clamp 50 and the valve body 40. The resilient member 76, such as a spring, is used to bias the clamp 50 away from the base 24 to assist in removal of the clamp 50 from the base 24.

If the valve 22 is to be removed, the Allen key 74 can be used to turn the fastener 41, allowing the clamp 50 to move away from the valve 22. This allows for easy removal of the valve 22 for maintenance, repair or replacement from the valve block with single touch interchangeable valves 20.

Figure 11:
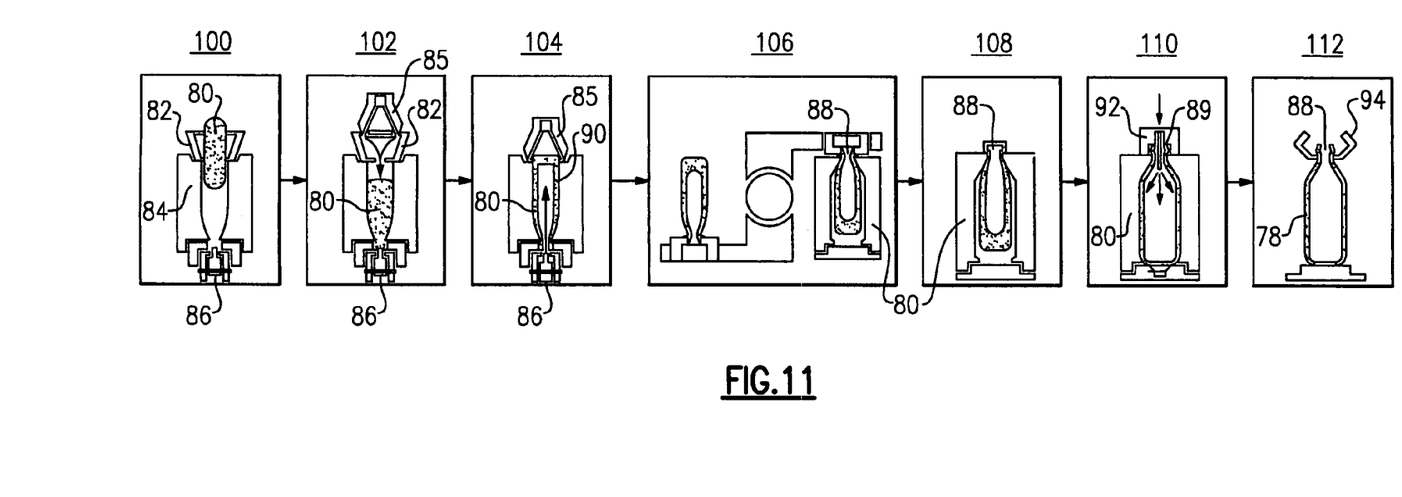
FIG. 11 illustrates a flow chart of a process of making a glass bottle.

FIG. 11 illustrates an example of how a glass bottle 78 is made using the valve block with single touch interchangeable valves 20. Each valve 22 performs a step in the process of forming the glass bottles 78. Although the valve 22 associated with each step is not shown or described, it is to be understood that each of the valves 22 perform a function that contributes to the manufacture of the glass bottle 78.

A gob 80 of viscous glass is dropped through a funnel 82 into a mold 84 defining a bottle shape in step 100. A plunger 86 creates the opening of the glass bottle 78. In step 102, the gob 80 is allowed to settle, and a baffle 85 blows air onto the gob 80 through the funnel 82. In step 104, the air is blown into the mold 84 through the opening 88, expanding the gob 80 into a bottle shaped component 90. The mold 84 is then transferred to another location in step 106 and reheated in step 108. A final flow of air is blown into the opening 88 through a blow head 89 in step 110. Finally, in step 112, the mold 84 is then lifted, and arms 94 engage the glass bottle 78 to transfer the glass bottle 78 to another location.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An air valve manifold comprising:
   a base;
   a valve including a valve body attached to the base, wherein the valve body includes a first projection on a front of the valve body and an opposing second projection on an opposing rear of the valve body, and the front of the valve body define a front surface and the rear of the valve body defines a rear surface, wherein one of the valve body and the base includes one of a third projection and a slot, and the other of the valve body and the base includes the other of the third projection and the slot, wherein the third projection is received in the slot to align the valve body relative to the base;
   a first attachment feature secured to the front of the base that retains at least a portion of the first projection of the valve body to the base, wherein the first attachment feature is separate from the base, wherein the first attachment feature contacts an upper surface of the valve; and
   a second attachment feature secured to the base that retains at least a portion of the opposing second projection of the valve body to the base, wherein the second attachment feature is separate from the base, wherein the second attachment feature contacts the upper surface of the valve.

2. The air valve manifold as recited in claim 1 including a plurality of valves, wherein each of the plurality of valves is employed to form a glass bottle, and each of the plurality of valves includes the first attachment feature and the second attachment feature which are independent to each of the plurality of valves.

3. The air valve manifold as recited in claim 1 wherein a speed control unit and the base are mounted to an air entry unit.

4. The air valve manifold as recited in claim 1 wherein the first projection and the opposing second projection are located near a lower portion of the valve body.

5. The air valve manifold as recited in claim 1 wherein the first attachment feature includes a first attachment feature projection that defines a recess underneath such that the first projection of the valve body is located in the recess and between the first attachment feature projection of the first attachment feature and the base.

6. The air valve manifold as recited in claim 1 wherein the first attachment feature is secured to the base by a fastener having an axis that extends generally horizontally.

7. The air valve manifold as recited in claim 1 wherein the second attachment feature includes a second attachment feature projection that defines a recess underneath such that the opposing second projection of the valve body is located in the recess and between the second attachment feature projection of the second attachment feature and the base.

8. The air valve manifold as recited in claim 1 wherein the second attachment feature is secured to the base by a fastener having an axis that extends generally vertically.

9. The air valve manifold as recited in claim 1 wherein the base includes the third projection and valve body includes the slot.

10. The air valve manifold as recited in claim 1 including a resilient member located between the first attachment feature and the valve body.

11. The air valve manifold as recited in claim 10 wherein the resilient member biases the first attachment feature outwardly and allows the first attachment feature to move axially in a generally horizontal direction during attachment of the valve to the base.

12. The air valve manifold as recited in claim 1 wherein the first projection and the opposing second projection of the valve body are beveled.

13. The air valve manifold as recited in claim 1 wherein the first attachment feature and the second attachment feature are each attached to the base by a fastener.

14. The air valve manifold as recited in claim 1 wherein the first attachment feature and the second attachment feature are removable from the base.

15. The air valve manifold as recited in claim 1 wherein the first attachment feature and the second attachment feature are accessible and visible when the valve is attached to the base.

16. An air valve manifold comprising:
a base;
a plurality of valves each including a valve body attached to the base, wherein the valve body includes a first projection on a front of the valve body and an opposing second projection on an opposing rear of the valve body, and the front of the valve body define a front surface and the rear of the valve body defines a rear surface;
a first attachment feature secured to the front of the base that retains at least a portion of the first projection of the valve body to the base of each of the plurality of valves, wherein the first attachment feature includes a first attachment feature projection that defines a recess underneath such that the first projection of the valve body is located in the recess and between the first attachment feature projection of the first attachment feature and the base, wherein the second attachment feature contacts an upper surface of the valve; and
a second attachment feature secured to the base that retains at least a portion of the opposing second projection of the valve body to the base of each of the plurality of valves, wherein the second attachment feature includes a second attachment feature projection that defines a recess underneath such that the opposing second projection of the valve body is located in the recess and between the second attachment feature projection of the second attachment feature and the base, wherein the first attachment feature contacts the upper surface of the valve,
wherein the first projection and the opposing second projection are located near a lower portion of the valve body, and
wherein each of the plurality of valves includes the first attachment feature and the second attachment feature which are independent to each of the plurality of valves.

17. The air valve manifold as recited in claim 16 wherein a speed control unit and the base is mounted to an air entry unit.

18. The air valve manifold as recited in claim 16 wherein the first attachment feature of each of the plurality of valves is secured to the base by a fastener having an axis that extends generally horizontally.

19. The air valve manifold as recited in claim 16 wherein the second attachment feature of each of the plurality of valves is secured to the base by a fastener having an axis that extends generally vertically.

20. The air valve manifold as recited in claim 16 wherein one of the valve body of each of the plurality of valves and the base includes one of a third projection and a slot, and the other of the valve body of each of the plurality of valves and the base includes the other of the third projection and the slot.

21. The air valve manifold as recited in claim 20 wherein the base includes the third projection and valve body includes the slot, wherein the third projection is received in the slot to align the valve body relative to the base.

22. The air valve manifold as recited in claim 16 including a resilient member located between the first attachment feature and the valve body of each of the plurality of valves.

23. The air valve manifold as recited in claim 22 wherein the resilient member biases the first attachment feature outwardly and allows the first attachment feature to move axially in a generally horizontal direction during attachment of the valve to the base.

24. The air valve manifold as recited in claim 16 wherein the first projection and the opposing second projection of the valve body of each of the plurality of valves are beveled.

25. The air valve manifold as recited in claim 16 wherein the first attachment feature and the second attachment feature are separate from the base.

26. The air valve manifold as recited in claim 16 wherein the first attachment feature and the second attachment feature are each attached to the base by a fastener.

27. The air valve manifold as recited in claim 16 wherein the first attachment feature and the second attachment feature are removable from the base.

28. The air valve manifold as recited in claim 16 wherein the first attachment feature and the second attachment feature are accessible and visible when the valve is attached to the base.

* * * * *